United States Patent [19]

Pedlow

[11] E Re. 31,428

[45] Reissued * Oct. 25, 1983

[54] FIRE PROTECTIVE TAPE

[75] Inventor: J. Watson Pedlow, Media, Pa.

[73] Assignee: Thomas & Betts Corporation, Raritan, N.J.

[ * ] Notice: The portion of the term of this patent subsequent to Feb. 19, 1997, has been disclaimed.

[21] Appl. No.: 317,699

[22] Filed: Nov. 2, 1981

Related U.S. Patent Documents

Reissue of:

[64] Patent No.: 4,273,821
Issued: Jun. 16, 1981
Appl. No.: 92,063
Filed: Nov. 6, 1979

U.S. Applications:

[63] Continuation-in-part of Ser. No. 872,820, Jan. 27, 1978, Pat. No. 4,189,619.

[51] Int. Cl.[3] ..... B32B 7/00; B32B 9/04; B32B 5/16; H02G 3/04

[52] U.S. Cl. ..... 428/215; 428/265; 428/268; 428/272; 428/273; 428/274; 428/275; 428/325; 428/494; 428/500; 428/921; 174/121 A; 106/18.11; 106/18.27; 106/18.36

[58] Field of Search ..... 428/215, 265, 268, 272, 428/273, 274, 275, 921; 106/18.11, 18.27, 18.36; 174/121 A

[56] References Cited

U.S. PATENT DOCUMENTS

| | | | |
|---|---|---|---|
| 3,090,764 | 5/1963 | Ellis et al. | 260/DIG. 24 |
| 3,642,531 | 2/1972 | Peterson | 174/121 |
| 3,861,425 | 1/1975 | Clark | 428/921 |
| 3,912,671 | 10/1975 | Konda et al. | 106/15 FP |
| 3,928,210 | 12/1975 | Peterson | 174/121 A |
| 3,940,549 | 2/1976 | Whittum et al. | 106/15 |
| 3,955,032 | 5/1976 | Michutin | 428/275 |
| 4,018,962 | 4/1977 | Pedlow | 174/121 A |
| 4,018,983 | 4/1977 | Pedlow | 174/121 A |
| 4,064,359 | 12/1977 | Peterson et al. | 428/268 |
| 4,189,619 | 2/1980 | Pedlow | 174/121 A |

*Primary Examiner*—William R. Dixon, Jr.
*Attorney, Agent, or Firm*—Robert M. Rodrick; Salvatore J. Abbruzzese; Jesse Woldman

[57] ABSTRACT

A fire protective tape using a halogen-free mastic coating on a fabric support is provided, the essential components of the mastic being solids including a low fusing ceramic frit, hydrated solids having chemically bonded water which is released as a fire protective water vapor when heated, solids which expand or intumesce during the same heat application to form a porous, expanded or foamy insulating body, solids which have a fire break effect, such as antimony oxide and zinc tetraborate, and binder solids which are thermoplastic resins and serve to bind the solids into a flexible coating when applied, the binder solids being dispersed as an emulsion in water and mixed with the other solids to form a mastic. With further addition of water the mastic is converted to a selected viscosity for application by troweling, coatingor spraying. The mastic is applied as a coating upon the sheet-like carrier, which may be wound as a tape upon single or grouped electric power and control cables to restrict fire propagation and to prevent self ignition of cables from fires due to overloading or other electrical faults, or from oil, waste or trash fire sources, thereby minimizing the danger of self ignition of gases or combustible materials such as other cable jacketing, insulation or other flammable materials.

11 Claims, 9 Drawing Figures

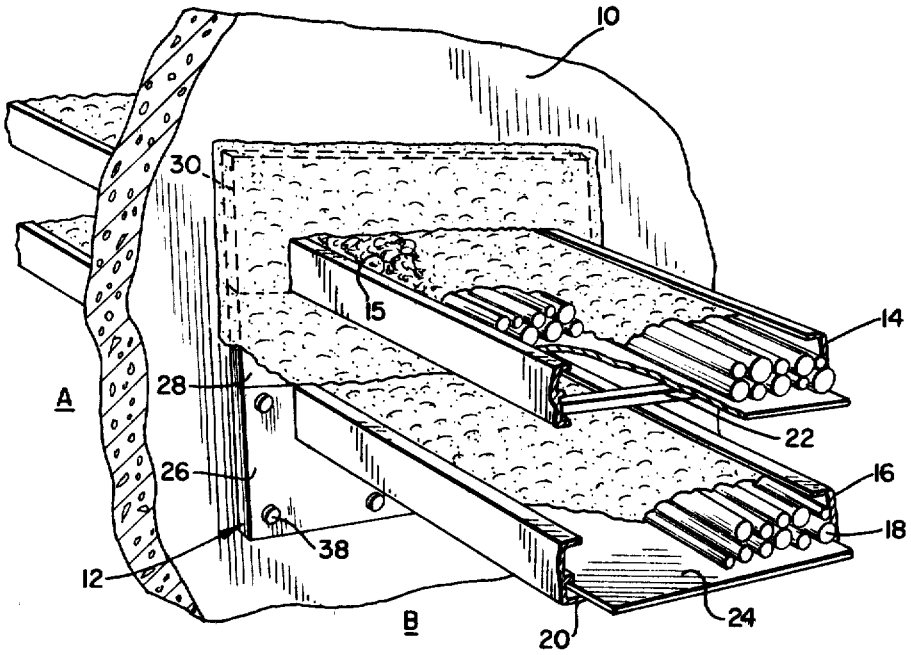
FIG. 1
FIG. 2
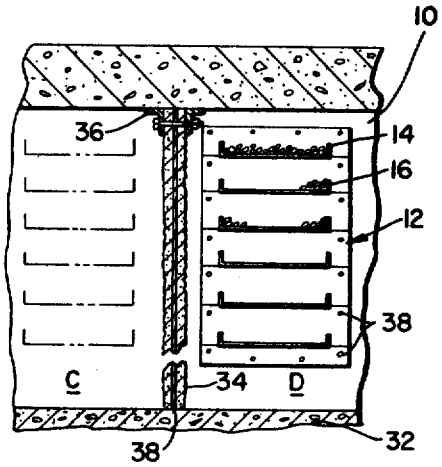
FIG. 3
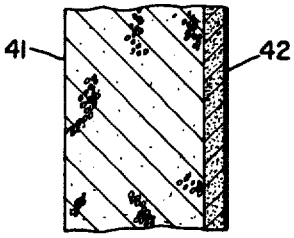

FIRE PROTECTIVE TAPE

Matter enclosed in heavy brackets [ ] appears in the original patent but forms no part of this reissue specification; matter printed in italics indicates the additions made by reissue.

This application is a continuation in part of my copending application Ser. No. 872,820 filed Jan. 27, 1978 and now U.S. Pat. No. 4,189,619 issued Feb. 19, 1980 in which the invention relates to a fire protective mastic and fire stop for electrical cables and neighboring wall junctures or partitions through which the cables pass, the mastic comprising protective water vapor-evolving substances, other substances which intumesce or expand, and still others which glaze with sufficient heat and form a stable protective porous coating having a fused ceramic casing upon the electric cables and fire stop panels, when exposed to fire. The mastic is also useful as a precast boot for mounting upon cables or splices, or as an air and fire seal or caulk disposed upon or between cables, the mastic filling cracks or crevices between cables or panels and cables, and serves as a coating upon fire stop panels and upon neighboring walls, and for wall paneling per se through which electric cables pass as a fire protective wall and in which the paneling or boot per se may be formed of the precast dry mastic.

The invention of the present application relates to an electric arc and fire protective tape, using the mastic of the parent application coated upon a sheet or strip-like support typically a strip of plastic or of woven fiber. The mastic contains large quantities such as 60 to 85% of a mixture of solids of several types, each with a distinct function to provide in combination a superior fire protective effect. The solids are formed into a mastic by a binder resin dispersed in water in quantity to form a coherent coating when dry, whereby the solids and the dispersion may be evenly mixed. Additional quantities of aqueous diluent may be added in the mixing, for conversion of the dispersion of resins and dry solids to a trowelable, coatable or even sprayable composition, as needed to provide the requisite fluidity for application.

Some of the solids include intumescing or decrepitating substances, typically cenospheres, which are flyash, inorganic particles evolved as dust from coal combustion and are very light, volatile and expandable with heat, like tiny fused balloons. It is that expansion of such gas evolving substances in combination with other vapor producing substances mixed therewith which, when the composition is heated under fire exposure at temperatures above about 1000° F. such as 1200° F. to 3000° F. to activate the intumescing components and release vapors which convert the composition from a thin layer coating disclosed in my parent application as applied on a cable or panel and herein coated upon a carrier sheet or strip as a tape, to expand to its heat insulating form. Such intumescent solids are present in the range of 5–40%, preferably 7–25%.

Other solids present in the mastic composition are of a chemical hydrate character, having chemically or physically combined water, such as hydrous oxides, silicates and other hydrated substances which firmly bond the water and which decompose with the heat of a fire and evolve large quantities of cooling, non-corrosive oxygen-displacing and fire-protective water vapors. Such hydrous oxides are typically hydrous alumina, magnesia and the other water evolving hydrous oxides and silicates. These hydrated components are used in quantity of 10 to 40% and preferably in quantity of 15 to 30%.

Still other solids in the mastic comprise a heat fusible ceramic frit which, when heated sufficiently upon an outer surface of the expanded coating, exposed to high fire developed heat, glaze over and encase the expanded dry mastic as a fire protective film thereon, protecting the expanded coating and insulating the cables, or in or upon the fire stop panels or boots. Such frit generally is a low fusible glass, typically a borosilicate glass frit generally fusible in the range of about 700° to 1500° F. It is usefully used in the range of about 5 to 40%, and preferably about 10 to 25%.

The composition includes a thermoplastic resin as a binder dispersed in water, the aqueous dispersion being mixed evenly with said solids to form the mastic. The thermosplastic resin is present in quantities sufficient to form a flexible binder for the mastic composition when dry, as a coating upon the electrical cables or panels, or to bind the panels or boots upon drying into a strong structural form. Sufficient additional water is added in the mixing as stated, for supplying requisite fluidity for application. The resinous solids are present in the quantity of about 15 to 40% of the dry composition, preferably 20 to 30%. Such thermoplastic substances may be any useful thermoplastic binder resin, which is halogen-free, but which may melt and flow by heat developed during fire and allow the composition to expand to a heat insulating coating. The typical resins for this purpose are halogen-free to avoid decomposition and release of noxious and corrosive halogen gases, and may be typically polyvinyl acetate, polyacrylic acid, polyacrylic lower alkyl esters, such as methyl or ethyl esters thereof, polymethacrylic acid and its lower alkyl esters, such as methyl and ethyl esters thereof, as well as mixtures of such acrylic resins, natural and artificial rubber latices, each as dispersions in water, said dispersions usually having from 25 to 75% of resin solids therein, usually 45 to 65% resin solids, the balance being water with minor quantities of dispersing agents.

The composition may further include small quantities of combustible fiber, such as cotton, rayon, aramide or the like, to provide a temporary coating stability for the wet or molten mastic. For this purpose the fiber need not be fire proof and may burn as the composition becomes heated when exposed to fire and will only be used in minor quantity, generally less than 5%, usually 0.5 to 2.0% to supply this temporary binding function. In present use as a coating upon a fibrous sheet, the additional fiber may optionally be omitted, with the sheet-like base usually of fiber performing much of this function.

The composition will further contain among the solids, such fire retardant substances as antimony oxides, which develop vapors with heat along with the protective water vapors evolved. Antimony oxide also is a low fusible component and contributes to the formation of the fused frit casing during fire exposure. Another fire retardant solid is zinc tetraborate which, through synergistic action, further improves the fire-retardant character of antimony oxide in the mixture. These fire retardant antimony oxides and zinc tetraborates are each used in quantity of 2 to 15%, preferably 4 to 10% and 5 to 10% respectively.

Other solids present in the composition are each added for a specific minor function and will be present generally in quantity from about 0.1 to 10%, some, generally less than 2%, adequate only to perform the function. Thus, other solids may consist of emulsifying agents, typically octyphenyl-polyethoxy ethanol available commercially as Triton X 100, in quantity of about 0.5 to 5%. Rust inhibitors, generally in quantity of about 0.2 to 5%, such as potassium polyphosphoric acid esters. Preservatives, such as fungicides, which are mercury complexes, in quantity of about 0.01 up to about 0.05. Viscosity controlling agents, such as alkali metal salts of polycarboxylic acid or oil based liquid polysiloxanes in quantity of 0.2 to 5%. Thickeners, such as hydroxy ethyl cellulose and a clay type inorganic gelling agent, such as attapulgite clay in quantity of 0.1 to 2%. These several minor additive components for these functions are used in quantity sufficient for the stated function, and each generally will be present in quantity of less than 10%, and usually from 0.2 to 2%.

Thus the vapors evolved are non-corrosive gases consisting of water vapor, antimony oxides and minor heat decomposition vapors of the resin and fiber. Such halogenated resins as release halogen, typically chlorine, such as polyvinyl chloride or numerous halogenated plasticizers as also are commonly used in the fire proofing art and whose destruction and release by heat during cable failure, as by arcing, short circuitry or destruction by fire from other sources in the neighborhood of the cables and protectively coated with such fire proofing substances, as release halogen, are avoided, whereby both the mastic composition and carrier sheet upon which the mastic is coated as a tape hereof releases no noxious and corrosive halogen gases.

In forming this mastic mixture, the binder emulsion of resin in water is further mixed with the dry intumescing and fire proofing solids, and reduced with a small additional quantity of water as needed to homogeneously mix the filler solids and emulsion for application.

The mastic can be sprayed in thicknesses of 0.025" to 0.150" and air dried to form a thick flexible coating on the electrical cables and wall panels forming a heat insulating and fire proofing mastic as well as an effective heat insulating air seal and fire stop.

The mastic of my parent application is intended both as moldable mixture for forming into fire proofing boots to be installed upon cable joints and splices or on dry wall panels through which electrical cables may pass, or as a thick suspension in water to be applicable as a protective mastic filler and coating body upon and about group cables, entering leaving and passing through a floor slab or fire wall. Wall penetrations may be framed by a laminate-rigid panel board such as pressed ceramic fiber, gypsum, Marinite, having said mastic coating applied and dried upon one or both surfaces thereof, said mastic being poured, troweled or sprayed up to depths of two inches as required.

According to the present invention the mastic is coated upon a sheet or strip substrate preferably a woven or matted fiber fabric such as a polyester fabric typically DuPont Reemay which is spun-woven polyester. The fabric can also be cotton or a ceramic fiber typically glass fiber or carbonized acrylic fiber, each with characteristic advantages. For instance, cotton is almost smokeless, but inorganic fibers are stronger and heat resistant. It is preferred to knife coat the mastic composition upon the substrate usually fabric, to a selected thickness and dry the coating thereon at a moderately raised temperature below about 200° F. and preferably between 125° to 190° the temperature being regulated to prevent formation of bubbles by vapors evolving too rapidly. A convenient handling is to knife the coating on the fabric as it advances on rolls through the dryer, the fabric serving as the conveyor and becoming permanently embedded as a laminate to a dried coated mastic thickness of about 0.005 to 0.150 inches preferably 0.010 to 0.045 inches.

In prior applications of other heat and fire protective insulation substances upon electrical cables including a tape, these according to my prior U.S. Pat. Nos. 4,018,962 and 4,018,983 included halogen evolving resins and have been loosely wound as tape or mounted as a boot about a cable joint as fire protective means while or after the cables were assembled, both the tape and boot being relatively non-coherent to the cable. It was also proposed in U.S. Pat. Nos. 3,642,531 and 3,928,210 to coat cables as an aqueous emulsion of halogen evolving resins, including essentially halogen evolving plastizers, the heat insulating effect of such coating compositions being largely provided by inorganic fiber which functions comparatively poorly for this purpose, and the halogen gas evolved with heat decomposition is highly corrosive and toxic, a source of substantial danger and damage to personnel and equipment. Equally important, such compositions coat poorly and crack upon drying, and, under the destructive effect of high temperature, tend rapidly to peel, flake or powder away from the protective position upon the electrical cables which they were intended to protect. Such coatings, in contrast to the present fail to adequately meet the important fire and heat insulating needs to prevent destruction of cable jacketing and insulation-protecting critical power and multiple conductor control cables and to prevent propagation of fire along grouped cables in trays and through wall and floor penetration at flaming temperatures often exceeding 1,900° F.

The invention is further explained with reference to the drawings wherein:

FIG. 1 shows a perspective of groups of mastic covered cables passing through a wall which may be protected by the fire stop paneling and mastic hereof;

FIG. 2 is an elevation of several trays of cables arranged in a vertical tier as they will pass through a fire wall protected by the paneling hereof;

FIG. 3 is a detail showing the mastic as an outer lamina layer upon a conventional heat resistant wall board base;

FIG. 7 shows the mastic coating hereof on a fabric support; and

FIG. 8 shows the tape hereof wound about an electrical cable;

FIG. 9 shows a composite of several insulated conductors wrapped with the tape of FIG. 8 prior to the application of an extruded weatherproofing jacket.

Figure 4:
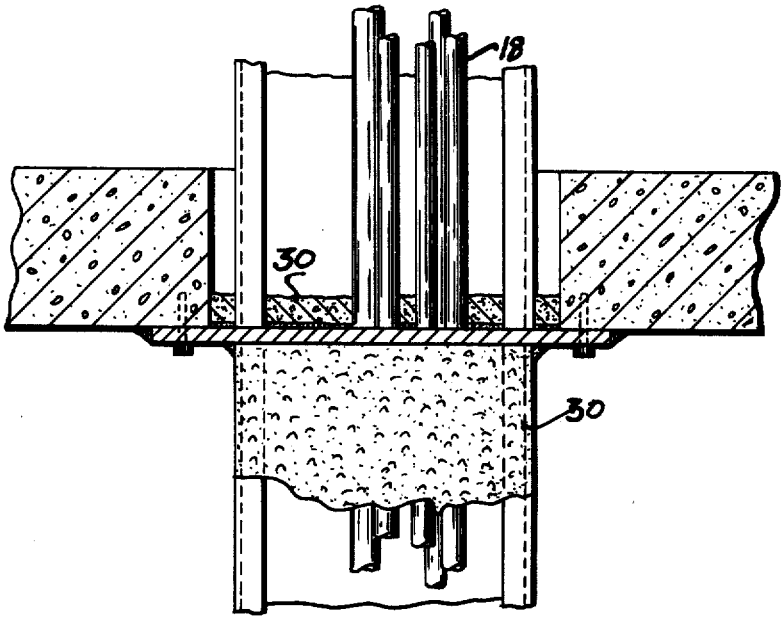
FIG. 4 is a detail showing the mastic poured about cables passing through a floor opening.

Referring to FIG. 1, a wall 10 of concrete or masonary separates spaces A and B as a partition for normal structural purposes and has a rectangular opening 12 cut therein for passage of a tier of trays 14 and 16 which support and partially enclose electrical cables 18. These cables are conventional groups of power or multiple conductor control cables mounted, insulated and jacketed for purposes of electrical insulation and moisture imperviousness. Thus the cables may carry critical communication circuitry or conduct electrical power, oftimes of high voltage. In any case, any building construction has many cables as a valuable part thereof and, for whatever electrical purpose they serve, great damage can be done to the structure and cables by electrical faults, such as short circuitry or extraneously caused fire, such as by exposed to flaming combination of oil, trash or the like, developing destructive heat in the cables. Again, the cables themselves are valuable in terms of the numerous communicating conductors and the redundant circuits which must be provided, as well as importance of wires which may be a part of the cables per se, all being desirably protected. The coating hereof effectively protects cables longitudinally or vertically against propagation of any fire, regardless of source, so that fire cannot damage redundant control and power circuits and penetrate into critical control areas.

Finally, it is desirable not only to encase the cables by fire preventive mastic, but also to protect one side of a partitioning wall 10 as a fire stop with insulation and insulating panels formed by the combination of a fire stop panel and mastic hereof, thus to prevent transfer of heat, flame or evolved gases to the opposite wall side of the fire stop.

Electrical cables 18 therefore, and for this purpose, are mounted in supporting trays 14 and 16, which may comprise channel irons 20, connected by a metallic ladder, expanded mesh or solid framework 22 which can terminate or pass through the opening 12 of the wall 10. The layers of cables can be further supported from below by a heat resistant panel moulded or cast from the mastic or a knife coated tape or blanket of mastic covered by this invention, the thickness of said blanket being in the range of 0.050 to 0.200 inches, preferably 0.100 to 0.125 inches.

At the wall opening 12 a further set of wall panels 26, 28 and are mounted each with cut-away portions (not shown) to fit over the cables and close the wall opening 12, as well as to closely close any spaces between cables passing through the wall. The cables pass directly through or themselves may each be enclosed in a supporting heat resistant metal sleeve or conduit (not shown). It is sometimes desirable to cover the interstices between the cables with loosely matted inorganic fiber which forms a filler for large spaces directing and supporting the mastic to close engagement with the cables and for allowing an overall coating as a bed of cables. Optionally, however, the mastic itself may be supplied alone to fill the space between the cables through the entire depth above the lower panel 24 up to a point above the surfaces of the cables as shown in FIG. 1, whereby, the cables become fully embedded within the dried mastic. The mastic can be sprayed over the grouped cables as $\frac{1}{8}''$ minimum thickness coating.

Figure 6:
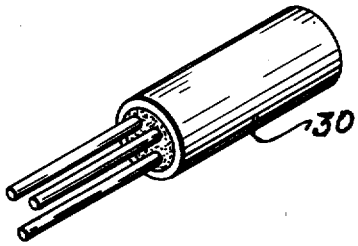
FIG. 6 illustrates a detail of conduit or pipe sleeve carrying cables which is filled with mastic.

Moreover, the mastic 30 is extended to cover the paneling 26, 28 and to fill all of the cracks and crevices therein, whereby the cables pass through the paneling and through the opening 12 of the wall 10, each crack, opening or space being filled with mastic. It may also be applied within conduit carrying cables to fill or plug the same as shown in FIG. 6. Moreover, the mastic is applied over the top of the cables and for secure closure of any cracks between panels, both around the panel edges as well as any spacing or cracks between the adjacent panels.

As shown in FIG. 1 two trays of cables pass through the wall 10 with the construction described. The cables may be present in any number and arranged in the trays in any grouping. Additional cables may be passed through the wall of the construction by cutting through the light pre-cast panels, cutting away some of the mastic and penetrating through the panel in a circular cut in a manner to accommodate one or more additional cables to be added from time to time, and the new cable being readily thrust through a newly formed cut portion. The newly added cables are coated with more fresh mastic and any cracks or crevices remaining about the newly added cables in the panels are further coated and sealed with more mastic, whereby additional cables are easily added from time to time.

As shown in FIG. 2 many trays can be assembled in a tier of trays passing to or through the wall, depending upon the wall size according to the size and height needed above the floor 32, whereby two stacks or more trays as may be needed to accommodate all of the cables can be used. In that case the separate stacks of cables C and D may be further separated by a partitioning wall 34, in which larger panels of the mastic hereof are assembled as a separating partition 34 and the partition may be supported as shown by angle iron brackets 36. It may be useful to separate the panels by a central laminated layer 38 which may be of metal wire of glass fiber or other reinforcing material.

The fire stop wall may be formed of fire proof paneling material, resistant to heat, whereby to operate as a fire-protective shield or partition between the opposite wall sides of spaces, as an easily assembled fire stop partition through which a group of cables pass, whereby the protective wall prevents heat and flame transfer, as well as the transfer of noxious vapors or smoke to its opposite wall side where continuing or redundant circuits may be installed. Particularly, the fire stop wall is intended to prevent transfer of heat, to the wall side opposite to that facing fire exposure and remains relatively cool on the opposite wall side from the high temperatures that may develop from a cable failure. The paneling may be formed of other useful pre-cast fire proof materials, but often is of the same dried mastic material as the mastic, also being applied as a coating upon the cables hereof, the mastic being cast into panels for assembly as dried panels into the fire stop wall hereof.

FIG. 3 illustrates a panel board which can be of any commercial ceramic fiber rigid insulating board (41) and which has coated thereon a thin $\frac{1}{8}$ to $\frac{1}{4}''$ coating 42 of the mastic hereof.

Figure 5:
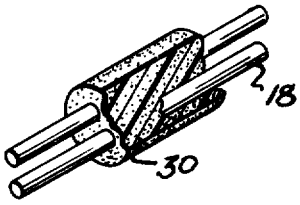
FIG. 5 shows a section of mastic coated cable.

As shown in FIG. 4 cables disposed as groups or individual cables disposed as groups or individual cables in sleeves pass through a floor slab 10 within the mastic hereof poured about and with the sleeve to form an air seal as well as a fire stop. FIG. 5 shows a section of a single coated cable with mastic applied by spraying, hand-wiping or extrusion.

Particularly for the present invention, the tape hereof is superior for wrapping of cables and electrical splices in that the mastic is more easily wrapped thereabout in the conventional application as a tape and superior in that the mastic does not evolve halogen vapors at or above decomposition temperatures. It is outstanding for protection of personnel and corrodable equipment exposed in confined spaces under high temperatures resulting from short circuiting conditions or other fire source, such as in mines, subways, shipboard, buildings and other confined spaces in which electrical equipment is placed or passes through, by virtue of the fact that no halogen is evolved at decomposition temperatures.

The present composition is highly heat and fire protective. It evolves only non-corrosive vapors, such as water vapors, inert nitrogen and $CO_2$ gases, antimony oxides and zinc tetraborate. It produces a porous heat expanded heat insulating body protective of the cable when destructive heat is applied, the coating being developed by expansion of the intumenscent substances and evolving gases which convert the coating to an expanded, porous, heat insulating body. The coating further contains a heat fusible frit which forms a glaze, strengthening and protecting the coating despite very high temperatures, whereby the coating is low heat transferring and does not powder, flake or peel off the surface of the cable to which it was applied.

Theoretically, it appears that during the heating process when ignition and combustion take place through electrical faults such as arcing or short circuitry or other source of high heat evolution, the coating first in the presence of heat softens the thermoplastic component. The intumescing substances such as cenospheres and the hydrous oxides with enough heat begin to expand as well as to evolve water vapor as well as nitrogen and $CO_2$ gases which are occluded in the cenospheres. The antimony oxide at higher temperatures can evolve its vapors. The fiber which is ultimately heat decomposable, operates in the cold to help bond the composition into a firm, strong and crack-free coating while it dries. As the initial heating is applied, the thermoplastic binder melts, but the fiber tends to prevent the resin from flowing away, maintaining the integrity of the composition while it steadily expands with the heat. Ultimately the fiber and the resin may be charred to an infusible porous mass, developed by the expanding intumescing solids. The expanding mass carries much of the fusible frit to the coating surface, where at high heat exposute temperatures, the frit can fuse protectivey as a refraction shell over the porous mass to prevent further heat passing into or from central or inner cable portions. The glazed frit serving further as reinforcing shell to prevent further ingress of great heat and prevents the mass from peeling or flaking away from its protective position about the cable.

The composition functions similarly either as a component of the total panel body or as an even outer layer on the paneling, whereby the mastic substance thereof will expand with heat protectively as a fire barrier or stop. One side of the panel of great heat exposure absorbs and prevents passage of heat, acting as a heat and fire stop partition or protective wall, allowing little heat to pass to the opposite side which remains comparatively cool. A similar effect is achieved both by using ordinary non-heat conductive paneling substances such as commercially available insulating board of ceramic fiber which, however, is coated with the mastic hereof to improve the wall paneling as a fire stop through which the cables pass.

The water component hereof is free water. The resinous emulsion may be quite thick and more water to that contained in the resinous emulsion is usually added merely supplied as free water in quantity sufficient to adjust the mixture to a trowelable, pourable, on down to sprayable mastic, as desired. For purposes of easy distribution of the water, various surfactants such as Triton X 100 an alkylphenoxy, polyloweralkyleneoxy, loweralkanol in which the alkyl has 1-2 carbon atoms, and the product may contain from about 10-40 alkyleneoxy groups.

The resinous binder hereof is dispersed as an emulsion in water in concentration of 45 to 65% resin solids the remainder being water. Minor additives may be supplied to improve the body and flexibility, typically an anti-foam agent such as Colloid 677, an oil based polysiloxane, thickeners such as hydroxylethyl cellulose, rust inhibitors such as Strodex PK-90, a potassium polyphosphoric acid ester, and preservatives of an anti-fungal nature, such as Troysan, an organic mercurial complex. Such additives will be used in the minor quantity 0.1 to 5% and sometimes as high as 10%, but generally less than 1%, and usefully less than 0.2% such as 0.1 to 1%, and are generally mixed in a carrier such as a propylene glycol in quantity usually less than 2%, such as 0.5-1%.

| THE FOLLOWING IS A GENERAL FORMULA FOR THE MASTIC | WEIGHT PERCENT PREFERRED | TOTAL RANGE |
|---|---|---|
| WATER (added to control body) | 5-15 | 1-30 |
| RESINOUS DISPERSION | | |
| Halogen-free resin solids | 20-30 | 15-40 |
| ADDITIVES | | |
| Common surfactant, e.e. Triton X 100, octyl phenyl polyethyleneoxyethanol, Tamol sodium polycarboxylate; Anti-foaming agent, i.e. colloid, oil based polysiloxane; thickener, QP 4400 hydroxy ethyl cellulose; Strodex PK 90, potassium polyphosphoric acid methyl ester; attapulgite gel, diatomaceous clay; fungicidal preservative, Troysan CMP acetate mercurial complex, propylene glycol, or wet strength enhancing acrylic resin | 0.2-5 | 0.1-10 |
| ORGANIC FIBER | | |
| Typically aramid, rayon, wool or cotton. | 0.5-2.0 | 0.1-5 |
| WATER VAPOR EVOLVING | | |
| Hydrous oxides (inorganic hydrates having chemically combined water evolvable only under fire conditions). | 15-30 | 10-40 |
| INTUMESCENTS | | |
| Cenospheres | 7-25 | 5-40 |
| FIRE-PREVENTATIVES | | |
| Zinc Tetraborate | 5-10 | 2-15 |

-continued

| THE FOLLOWING IS A GENERAL FORMULA FOR THE MASTIC | WEIGHT PERCENT PREFERRED | TOTAL RANGE |
|---|---|---|
| Antimony Oxide | 4–10 | 2–15 |
| FRIT | | |
| Ceramic Glazing Solids (typically low-fusing borosilicate glasses generally calcium, magnesium, zirconium, borosilicates (generally lead-free). | 10–25 | 5–40 |

In forming the composition, the dry components are mixed and evenly blended with the plastic to form a heavy mastic, adding a small quantity of water in the range stated, sufficient to bring the mastic up to a viscosity suitable for application upon the cables assembled and panels as show, filling all of the openings, cracks and crevices. The mastic formed as described may be extruded or pressed into sheets of desired thickness, such as ¼–1½ inches thick. In order to improve both the dry and wet structural properties of the panel pressed or extruded from the mastic mass, an addition of a heat polymerizable acrylic resin, such as Rohm and Haas X-980 is added. The wet panel may be set by drying and removing the moisture at ambient temperatures. When the acrylic additive in the range of 2–10%, preferably in the range of 4–6%, it is necessary to raise the panel temperature to 300°–350° F. in order to complete the polymerization. Without such acrylic additive, the tape or other mastic product is less sensitive to moisture.

The cables themselves are encased in coating, which may be thin and flexible or may be applied as a filler mastic between a group of cables as shown in FIG. 1 and which may pass through the paneling, cut with holes to allow cables or trays having a number of separately spaced cables to pass through from side to side of the fire stop wall, and the cracks and cervices about each cable are then filled with the mastic as shown in FIGS. 1 and 6. Thus the mastic is applied by spraying, troweling or brushing upon the cables, between the cables, upon the fire stop wall as a coating and as the paneling substance from which the wall per se is formed.

As shown in FIG. 7 an electrical arc and fire protective tape is provided having cellulose sheeting or non-woven polyester film or fabric base 102 or preferably cellulose fibers such as cotton or rayon which have been previously treated with fire retardant salts and, on this substrate a coating 104 of the mastic described above is applied preferably within the thickness limits stated. The mastic can also have small fibers 106 as listed above embedded within the mastic. In forming the tape, the fabric 102 becomes a conveyor and the wet mastic is applied in the thickness within the range stated by a knife and doctor blade as in conventional coating, the wet coated sheet is passed through a warmed oven or drying chamber through which a stream of warm air is circulated to provide a drying temperature lower than about the boiling point of water, whereby the water will evaporate to leave the dried mastic coating upon the fabric. It is desirable to dry the coated sheet or fabric in the warm air stream while moving at low speeds of below 10 feet per minute, a rate slow enough within the drying chamber to allow removal of the moisture from the tape at a slow enough rate to avoid any significant formation of vapor bubbles in the wet mastic while drying. That drying rate can be accelerated somewhat by inclusion of a small quantity of mineral spirits such as petroleum about 1 to 2% added to the mastic mixture, to supply an azeotropic vaporization of the water and petroleum ether at a somewhat lower temperature and thereby promote a faster drying rate. The azeotropic component can be omitted and the drying can be effected at a slower rate. The tape having dry mastic thereon bears the benefits of the superior fire and arcing prevention character of the mastic.

As shown in FIG. 8 the tape 100 may be wound about a cable sheath 108 in the manner typical for the insulation of a cable by a tape. As shown in FIG. 9 the tape 100, which in this case is a thin laminate of mylar (0.001") 103 and mastic (0.010") 100 wrapped around the insulated multiple conductors and the mastic/mylar laminate wrap covered with an extruded water resistant jacket 108 of polyethylene, polypropylene, ethylene propylene rubber or equivalent of some 30 mils thickness.

As noted the tape support or substrate 102 may be of various types of woven or matted fiber, of which Reemay, a polyester spun-woven fabric is often preferred because of its substantial strength. It bears the disadvantage, however, that it evolves smoke with heat decomposition and from that aspect ordinary very light rayon or cotton fabric, such as gauze or even cheesecloth made fire retardant by pretreatments can be used because these evolve little smoke and will serve to adequately support the mastic layer while it is being applied as a knife coated surface layer. As a tape cotton fabric is physically of weaker construction but has the stated advantage of giving off little smoke upon heat decomposition. Polyester film such as Mylar as thin as stated can be used as a substrate in tapes for cable manufacturing. Also, ceramic fiber fabric or sheet can be used advantageously in that they give off no smoke and are more heat resistant, but from the aspect of economy are more expensive.

The following examples illustrate the practice of this invention:

EXAMPLE 1

Four hundred and sixty-two pounds of vinyl acrylic polymer dispersed in water in quantity of about 277 lbs of polymer, the remainder of said emulsion being water and additives. The additives consist of 13 lbs of propylene glycol, 6 lbs of Colloid 677, oil based liquid polysiloxane, 1.5 lbs of hydroxy methyl cellulose, 6.5 lbs of rayon fiber, 1.5 lbs of Strodex PK 90, potassium polyphosphoric acid ethyl ester and 0.5 lbs of a mercurial complex preservative. The entire mixture being a viscous dispersion in water. Separately, a dispersion of 1.0 lbs of Triton X 100, which is octyl phenyl polyethyleneoxyethanol, and 5.7 lbs of Tamol, sodium salt of polycarboxylic acid, are dispersed in 50 lbs of water. The aqueous solution of dispersing agents and additives is used to dilute the first resinous emulsion. Thereafter dry powders consisting of 190 lbs of hydrous aluminum oxide, 90 lbs of cenospheres, 80 lbs of zinc tetraborate, 68 lbs of antimony oxide and 163 lbs of frit, a low temperature borosilicate glass essentially lead-free calcium silicate ceramic glass, available from the Ferro Corporation as FB282. Thickeners such as Attagel 40 are added to the extent of 10 lbs to control consistency. The dried powders are mixed into the diluted liquid emulsion to form a sprayable mastic which is sprayed upon electrical cables and upon fire stop panels. The mastic dries at ambient temperatures in air to form approximately a ⅛ to ¼ inch thick, on average, coating, firmly and flexibly adherent to the cable surface. The base of the panel is commercial ceramic fiber board, such as Kaowool, Duraborad board of 1 inch thickness.

The coated panel of example I, about 1" thick was tested according to ASTME 119 by supporting the panel above a flame having an average firing temperature of 1725° F. The flame impinges against the coated side and the temperature of the uncoated side was measured to determine the heat transfer effect. It was found in a series of three hour burning tests that the maximum temperature measured on the uncoated side was about 330° F. for the board with a ¼" coating the heated mastic generated only a small amount of smoke, the coating remained well adherent to the insulating board. For a ⅛" thick coating with mastic the average transferred temperature was 350° F. In a comparison with a competitive composition the temperature for a ⅛" coating was 380° F., and for an uncoated board the temperature was 400° F. In separate tests it was found that a standard vertical burn test (IEE - 383) applied to grouped cables coated with this mastic was self extinguishing after removal of the flame source; there was no apparent damage to jacketing or insulation during a 20 minute burn in which about 70,000 BTU per hour was applied to the coated cables, and there was no flame propagation after removal of the burner. The coating of this example is flexible, and after drying, the coated cables can be bent without cracking of the coating.

EXAMPLE 2

A similar mastic as example 1 was formed using a commercial mixture of polyacrylate resins dispersed in water available as UCAR 163, having similarly about 60% of polyacrylate total solids, of which 58% was mixed polyacrylics, the remainder being additives as in example 1. This thick resin was similarly diluted with water and additives, thinning the thick emulsion and into which is added the powders as example 1. The mastic coated upon the cables as shown is flexible and fire resistant by the same tests, and is highly heat insulating, a 1" thick panel coated with the mastic to a thickness of ⅛" average, and similarly exposed to a 1725° F. exposed flame for a three hour time period, transferred the average temperature to the opposite side of about 345° F. over the test period. Seven conductor control cables coated with a thickness of ⅛" min. were still flexible, and, in a special Factory Mutual test, were immersed and cycled in and out of 60° C. 1% salt water solution for thirty days, and the coating was unaffected and remained firmly adherent. In each of the tests examples 1 and 2 the heated surface had a ceramic glaze and the coating had expanded to a porous film of about twice the original applied and dried film thickness.

EXAMPLE 3

The mastic of Example 3 was formed by similarly thinning the commercial resinous dispersion of polyacrylic resins, reducing the extra quantity of water used in the thinning to a maximum of 15 lbs., whereby, the mastic was thicker and trowelable. In order to enhance the physical properties, particularly the wet modulus of the panels heat polymerized acrylic resin is added in the range of 2–10%, preferable 4–6%. In this form it was cast into panels and used as a fire stop panel in a test by exposure to a 1700°–1750° F. flame. The maximum temperature on the cool side a 1" panel was 285° F., on average over a three hour test period, the panel expanding and charring in the area of the applied heat, but conducted no flame when the burner was withdrawn.

As shown in FIG. 4 one or more cables can be passed vertically through a masonry floor, for which purpose they may be mounted within a pre-formed sleeve and the mastic poured around the sleeve. The mastic may also, as shown in FIG. 6 be filled into the body of the sleeve or applied only in separated portions thereof for support, thus acting as a firestop and sealing the cables for prevention of gas flow between spaces separated by the floor. The mastic will be filled or applied around the outside of the sleeve as shown to a selected depth, and other fire stop paneling as shown in FIG. 1 may also be used to close the floor opening.

FIG. 5 shows a single cable having a dried precoated film of mastic thereon, a form in which the cable itself may be handled.

EXAMPLE 4

The mastic composition as set forth in Example 1 is wet coated by doctor blade upon a strip of spun-woven Reemay fiber, a commercial product available commercially from the duPont Company, in a thickness of 0.035 inches and passed through an air drying oven slowly at about 1.5–5 linear feet per minute while being warmed by a counter current flow of air at 180° F. being substantially dried, cooled in air, slit into appropriate widths and wound into a roll of tape. That roll of tape was wound upon a cable, the cable was wound in ½ overlap per turn about 1½ inch lead sheathed cable, as shown in FIG. 8, and heated to a temperature between 1700° and 1750° F. by a Fischer burner.

The tape formed has the following characteristics:

| CHARACTERISTICS | SUPERIOR FIRE PROTECTION DERIVED FROM: |
|---|---|
| Length of roll - 25' to give great economy in shipping, handling.<br>Weight per 3" × 25' roll - 28 ozs.<br><br>Thickness - 0.045"<br>Tensile strength - 350 psi (ASTM D-100)<br>Elongation - 125% at break | a. Chemically bound water in mastic composition driven off during fire exposure to provide cooling and reduce oxygen.<br>b. Inert gases ($CO_2$, $N_2$) physically entrapped in millions of hollow spheres (cenospheres) released during fire to displace oxygen needed to support combustion. |

-continued

| The tape formed has the following characteristics: | |
|---|---|
| CHARACTERISTICS | SUPERIOR FIRE PROTECTION DERIVED FROM: |
| Color - grey | c. Formation of a refractory, heat reflective surface over the burned area. |
| Resistant to fresh and salt water, sewage, acids, radiation. Flexible and conformable. Fumes from combustion - noncorrosive with minimal health hazard. Cellulose based substrate gives low smoke level. Burn - through resistance - prevents 1700° F. flame from burning through and melting lead (625° F.) for periods in excess of 30 minutes. | d. Mild intumescence providing additional heat insulation. |

The following table compares the results with several other commercial fire protective tapes offered in the trade for electrical similar purposes:

| TAPE | A | B | C | D | E - U.S. Pat. No. 4018962 Example 1 | F - Example 4 above |
|---|---|---|---|---|---|---|
| CURVE | | | | | | |
| SUBSTRATE | Carbonized Organic Fabric | Glass Skrim Fabric Embedded between PVC Film | Polyester Spunwoven Fabric | Nylon Woven Skrim Fabric | Spunwoven Polyester Fabric | Cotton Gauze Fabric |
| ELASTOMER | PVC Coating | PVC Calendered Film | PVC Calendered Film | Neoprene Calendered Film Laminate | PVC Plastisol | Mastic water-based Example above. |
| COLOR | Black | White | White | Brown | Gray | Gray |
| THICKNESS | 0.065" | 0.053" | 0.050" | 0.047" | 0.055" | 0.045" |
| TIME (mins) | TEMP °F. | TEMP °F. | TEMP °F. | TEMP °F. | TEMP °F. | TEMP °F. |
| ½ | 165° | 140° | 100° | 200° | 100° | |
| 1 | 340° | | 290° | 330° | 260° | 200° |
| 2 | 380° | 308° | 500° | 500° | 375° | 290° |
| 3 | 550° | 412° | 640° | 610° | 410° | 385° |
| 4 | 625° | 500° | | 650° | 435° | 437° |
| 5 | | 624° | | | 470° | 472° |
| 6 | | | | | 515° | 500° |
| 8 | | | | | 565° | 537° |
| 9 | | | | | 600° | |
| 12 | | | | | | 582° |
| 14 | | | | | | 595° |
| 16 | | | | | | 609° |
| 18 | | | | | | 615° |

It will be noted from the data on this table that various commercial tapes listed as A, B, C and D have poor insulating effects to destroy it at high temperature and temperatures of 625° F.±25° which is the melting point of a lead sheath were reached in times of four minutes or less, whereas the tape E of U.S. Pat. No. 4,018,962 had a much superior fire resistance but chlorine fumes resulted from the PVC combustion. The tape F of this invention, besides having even superior fire resistance, is halogen free.

The tape hereof can be applied protectively about other electrical equipment, cables, cable splices and appurtenant equipment for fire and electrical arcing protection.

Various modifications will occur to those skilled in the art, particularly other hydrous oxides and other known ceramic frits may be substituted.

Accordingly, it is intended that the disclosure be regarded as exemplary and not limiting, except as defined in the claims.

I claim:

1. An electrical arc and fire protective tape for disposition about electrical equipment, cables, cable splices, appurtenant equipment or the like, comprising a resinous mixture coated as a wet mastic mixture and dried upon a fabric base or plastic sheet or film substrate, said mastic comprising an essentially halogen-free mixture of solids and thermoplastic binder resins dispersed as an emulsion in water, said solids including heat intumescing and expanding substances in approximate quantity of 4 to 25% to expand the mastic to porous heat insulating foam, ceramic frits in approximate quantity of 5 to 40% to provide a ceramic glaze upon the surface of the dry expanded mastic when exposed to high temperatures developed by fire, hydrated substances in approximate quantity of 10 to 40% and having bonded water evolvable only by application of sufficient heat to decompose and evolve water vapors, *fire protective solids of the character of antimony oxide and zinc borate in approximate quantity of about 2 to 15%*, and a resinous thermoplastic binder in approximate quantity of 5 to 40% to bind said solids to the form of a flexible film in coated form of the mastic, said binder being dispersed as an emulsion in water, there being sufficient water in the emulsion to convert said solids into a fluidized form for application as a coating upon said base or substrate, said percentages being by weight, the said solids quantity being based on the total solids of the composition.

2. The tape as defined in claim 1, said mastic further containing a small quantity, less than about 5% of organic fiber said composition further containing from about 1 to 10% of emulsifying agents, rust inhibitors, fungicides, viscosity controlling, thickening, and wet strength enhancing agents.

3. The tape as defined in claim 1, wherein the binder resin solids are in the range of 20 to 30%, dispersed in water, being substantially 45 to 65% resin solids and 55 to 35% water, the low fusible solids are ceramic frits in quantity of 10 to 25%, the hydrated substances are hydrous oxides in the ranges of 15 to 30%, the intumescing and expanding substances are cenospheres in the range of 7-25%, said mastic further containing a small quantity of about 0.5 to 2.0% of organic fiber, and fire retardants antimony oxide and zinc tetraborate, each present in quantity of 4 to 10% and 5 to 10% respectively.

4. The electrical arc and fire protective tape as defined in claim 1, wherein the fabric base is organic fiber in woven, knitted, netted or non-woven matted form.

5. The electrical arc and fire protective tape as defined in claim 1, wherein the fabric base is polyester fiber in woven, knitted, netted or non-woven form.

6. The electrical arc and fire protective tape as defined in claim 1, wherein the fabric base is formed of carbonized acrylic fiber in woven, knitted, netted or matted form.

7. The electrical arc and fire protective tape as defined in claim 1, wherein substrate is a cellulose or polyester film such as cellophane or mylar in the thickness range of 0.001 to 0.005".

8. The electrical arc and fire protective tape as defined in claim 1, wherein the coating has a thickness in the range of 0.005 to 0.150 inches.

9. The electrical arc and fire protective tape as defined in claim 1, wherein the heat intumescing substances are cenospheres.

[10. The electrical arc and fire protective tape is defined in claim 1 further including about 2 to 15% of protective solids of the character of antimony oxide and zinc borate.]

11. The electrical arc and fire protective tape as defined in claim 1, wherein the fabric base is formed of inorganic fiber in woven, knitted netted or matted form.

12. The electrical arc and fire protective tape as defined in claim 1, wherein the fabric base is formed of glass fiber in woven, knitted, netted or matted form.

* * * * *